United States Patent [19]

Kakuta

[11] Patent Number: 4,909,034

[45] Date of Patent: Mar. 20, 1990

[54] LOW SPEED BACK PRESSURE GENERATOR FOR AFFECTING TORQUE OF AN INTERNAL COMBUSTION ENGINE

[76] Inventor: Yoshiaki Kakuta, 1-8-1, Hamakawado, Kasukabe-shi, Saitama-ken, Japan

[21] Appl. No.: 219,248

[22] Filed: Jul. 15, 1988

[30] Foreign Application Priority Data

Dec. 21, 1987 [JP] Japan ................. 62-323593

[51] Int. Cl.$^4$ ............................................. F01N 3/00
[52] U.S. Cl. .......................................... 60/324; 60/316
[58] Field of Search .................................. 60/324, 316

[56] References Cited

U.S. PATENT DOCUMENTS

| | | |
|---|---|---|
| 1,025,251 | 5/1912 | Desmond . |
| 1,424,234 | 8/1922 | Bowen . |
| 1,473,668 | 11/1923 | Byrnes . |
| 1,800,927 | 5/1929 | Brittain . |
| 1,867,802 | 5/1930 | Bogert . |
| 2,110,986 | 3/1938 | Kadenacy .............. 60/324 |
| 2,188,444 | 1/1940 | Sauer . |
| 2,586,788 | 2/1952 | Cushman . |
| 2,845,774 | 2/1955 | Bertin . |
| 3,234,924 | 2/1966 | May ....................... 60/324 |
| 3,969,895 | 7/1976 | Krizman ................. 60/324 |
| 4,060,985 | 12/1977 | Fukushima . |

FOREIGN PATENT DOCUMENTS

| | | |
|---|---|---|
| 2133754 | 1/1973 | Fed. Rep. of Germany . |
| 832895 | 5/1937 | France . |
| 1263892 | 10/1986 | U.S.S.R. . |
| 6853 | of 1908 | United Kingdom . |
| 258 | of 1913 | United Kingdom . |
| 292355 | 4/1928 | United Kingdom . |

Primary Examiner—Douglas Hart
Attorney, Agent, or Firm—Fleit, Jacobson, Cohn, Price, Holman & Stern

[57] ABSTRACT

A back pressure generator for affecting torque of an internal combustion engine having an exhaust system comprises a tubular housing, a main passage part for exhaust gas in the housing, a valve body movably supported in the main passage part for movement in response to the force of exhaust gas on the valve body, a valve seat in the main passage part which when engaged by the valve body closes the main passage part, a spring for resiliently urging the valve body towards the closed position having a predetermined force characteristic for moving the valve body into the closed position when the engine is idling and allowing the valve body to move in a direction downstream relative to the exhaust gas flow proportionally in response to the force of the exhaust gas on the valve body to a fully open position, regulating holes in the main passage engageable by the valve body for controlling the flow of exhaust gas through the main passage in response to the position of the valve body, and a separate passage in the housing for bypassing flow of exhaust gas around the valve body when the valve body is in the closed position and having a size for restricting flow sufficiently to produce back pressure in the exhaust system and affect the torque of the engine without stalling the engine.

17 Claims, 2 Drawing Sheets

LOW SPEED BACK PRESSURE GENERATOR FOR AFFECTING TORQUE OF AN INTERNAL COMBUSTION ENGINE

RELATED CASES

This application relates to copending U.S. Application Ser. No. 07/195,834 filed May 19, 1988, Ser. No. 07/210,857 filed June 24, 1988, and Ser. No. 07/219,247 filed July 15, 1988, in the name of the same inventor.

BACKGROUND OF THE INVENTION

1. Field Of The Invention

This invention relates to a back pressure generator for affecting a large torque during low speed operation of an internal combustion engine.

2. Description Of The Prior Art

An engine, for example for a motorcycle, which is adapted to be operated in a high RPM range has a small torque at a low speed and might lack stability. Further, a gasoline engine for a four-wheel vehicle similar to the above-described type, is not easily maintained in a stable state during idling. It is understood that the engine is, for example, effected at the starting time by the influence of a low torque during low RPM and could be easily stopped if the RPM is not raised even at a low speed and high reduction gear ratio. However, a technique for solving this problem is not disclosed at present.

BRIEF SUMMARY OF THE INVENTION

According to the inventor's knowledge and experience, it is preferable to apply a load to an engine to improve the torque of the engine at low RPM, and this can be performed to some degree by throttling the flow rate of exhaust gas in the exhaust passage. However, this is insufficient when the energy of the exhaust gas is increased, because the exhausting efficiency of the exhaust gas is reduced due to the throttling of the exhaust gas.

An object of this invention is to provide a low speed torque for an internal combustion engine which can improve the operation of the engine according to the principle described above, can obtain a large torque at the low RPM of the engine and can also maintain the torque responsive to an increase in RPM and maintain a stable operating state not only during idling, but also during the gradual increase in RPM from idling.

The above object of the invention can be achieved by a low speed back pressure generator for affecting the torque of an internal combustion engine comprising a main passage for exhaust gas and an idle passage provided independently from the main passage for discharging exhaust gas in an exhaust system, a movable valve body contained in the main passage to response to the magnitude of the energy of the exhaust gas, and a regulating region provided in the main passage for regulating the flow rate of the exhaust gas in response to the position of the movable valve body, wherein the idle passage is set at a small flow rate so as to discharge the exhaust gas at a rate which will not stop the rotation of the engine at low RPM.

The main passage and the idle passage indispensable for the low speed back pressure generator are provided at the downstream end and more preferably at the most downstream end of the exhaust system. When the engine has a muffler, they are preferably associated in the muffler. There is no problem in obtaining the low speed torque, but if the unit which produces a load is provided at the downstream end during high RPM, it imposes a resistance which reduces the output power.

The main passage serves to mainly discharge most of the exhaust gas discharged from the engine, and one or a plurality of main passage segments are provided.

The idle passage is provided and is always open to discharge the exhaust gas independently from the main passage, i.e., when the main passage is closed. Thus, the idle passage serves to discharge the exhaust gas at small flow rate during idling when the main passage is completely closed, and is set to provide some flow resistance, but allows discharge by throttling to a degree so as not to cause the engine to stop, and thereby effects torque from the engine.

The movable valve body in the main passage functions to close the main passage when the energy of the exhaust gas is weak or to slightly open the regulating region of the main passage to regulate the flow rate of the exhaust gas passing the main passage in response to the magnitude of the energy of the exhaust gas, and is a member for increasing the torque at the time of low RPM partly by the energy of the exhaust gas consumed in forcing the movable valve body to move toward the open position.

Thus, a spring, or a force storage member equivalent thereto, is provided for supporting the movable valve body against the flow of the exhaust gas. Since the movable valve body varies its resistance by altering the shape of the pressure bearing surface of the front, or upstream, surface on which the flow of the exhaust gas impinges between flat, hemispherical, conical or concave shape, the configuration of the movable valve body is varied. Therefore, the pressure bearing surface serves to alter the distance of movement and the responsiveness of the movable valve body to the variation in the energy of the exhaust gas according to its shape.

BRIEF DESCRIPTION OF THE DRAWINGS

The invention will now be described in detail with reference to the accompanying drawings, wherein.

DESCRIPTION OF THE PREFERRED EMBODIMENTS

Figure 1:
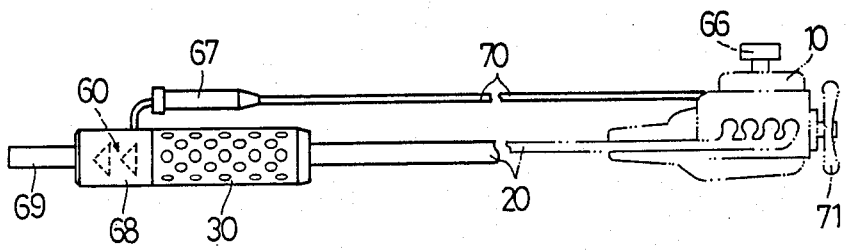
FIG. 1 is a schematic elevational view of an internal combustion engine in which an embodiment of a low speed back pressure generator for effecting torque is provided according to the present invention.

FIG. 1 shows a system of an internal combustion engine utilizing a low speed back pressure generator for effecting torque according to the present invention. Reference numeral 10 designates a gasoline engine, numeral 20 denotes its exhaust conduit, and numeral 30 depicts a muffler.

The muffler 30 as shown is open at the front at a connection port 31 to be connected to the exhaust conduit 20 and is provided with a main passage 32 having a smaller diameter than that of the connection port 31 as a member of the body of the low speed back pressure generator of the invention. A tapered wall surface 34 is formed from the connection port 31 to the inlet throttle 33 of the main passage 32 and is tapered inwardly toward the downstream side, and a plurality of inlets of an idle passage 35 open through the tapered wall surface 34.

Figure 2:
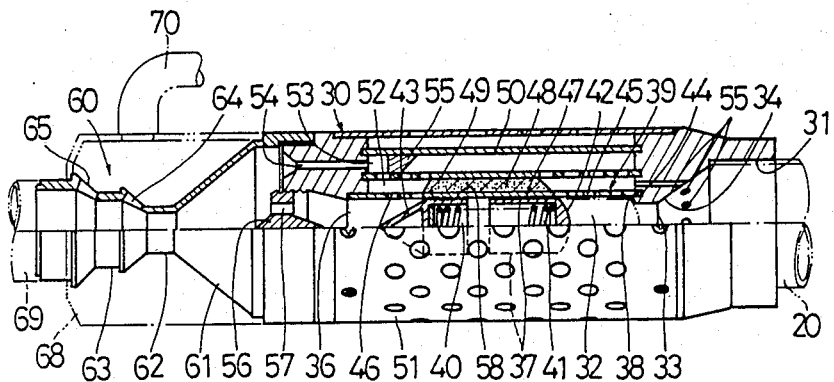
FIG. 2 is a partial longitudinal cross-sectional view of a muffler incorporating the invention.
Figure 3:
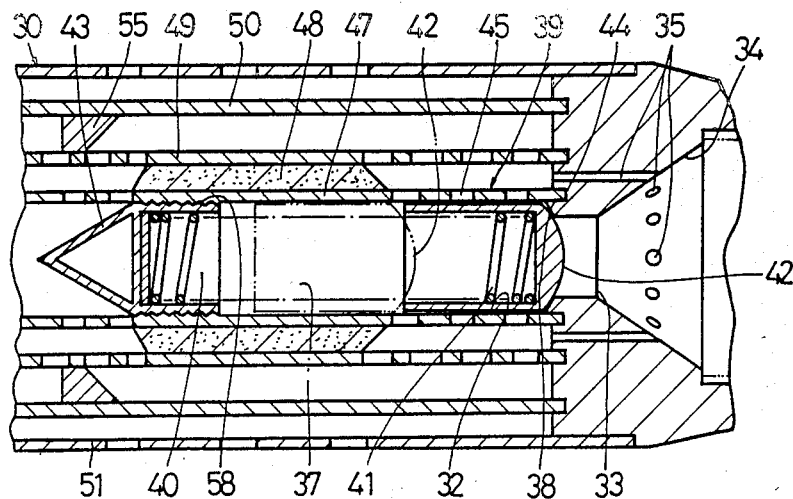
FIG. 3 is an enlarged cross-sectional view of the essential portion of FIG. 2 showing the invention.

The main passage 32 has a rear opening 36. A movable valve body 37 is inserted into the main passage 32 so as to be forwardly and rearwardly movable in a regulating region 39 between the rearward position and a throttle seat 38 at the forward end of main passage 32. Thus, the exhaust gas is fed around the regulating region 39. The movable valve body 37 is urged in the direction of contacting engagement with seat 38 by a coil spring 41 inserted between it and a stator 40 fixed to the wall of the main passage 32 adjacent the rear thereof. The movable valve body 37 shown in FIGS. 2 and 3 has a slightly hemispherical pressure bearing surface 42 on the front or leading end surface, and the stator 40 has a conical cover 43 at the rear end thereof.

An inner cylinder 44 which forms the main passage 32 has a number of pores penetrating between the interior and the exterior thereof. The pores 45 in the regulating region 39 serve to pass the exhaust gas stream through the forward portion of cylinder 44 and serve as regulating ports 45 at the time of high speed rotation of the engine, and the rear ports 46 serve to pass the exhaust gas to be discharged to the rear opening 36. A heat insulator 47 is provided at the intermediate portion of inner cylinder 44, and a heat insulating layer 48 is provided on the outer periphery of the inner cylinder 44 to protect the coil spring 41 against overheating. It is preferable to provide a heat insulator at the movable valve body 37.

A porous cylinder 49, a heat insulating cylinder 50 and a porous cover 51 are concentrically provided surrounding the outer periphery of inner cylinder 44, double bypass passages are formed inside heat insulating cylinder 50, the outlet of idle passage 35 is open at the bypass passages 52, 53, and a bypass acceleration outlet 54 is open at the rear. Reference numeral 55 designates an annular wall, numeral 56 denotes an exhaust gas stream acceleration member, and numeral 57 depicts the exhaust passage of the acceleration member 56.

Figure 4:
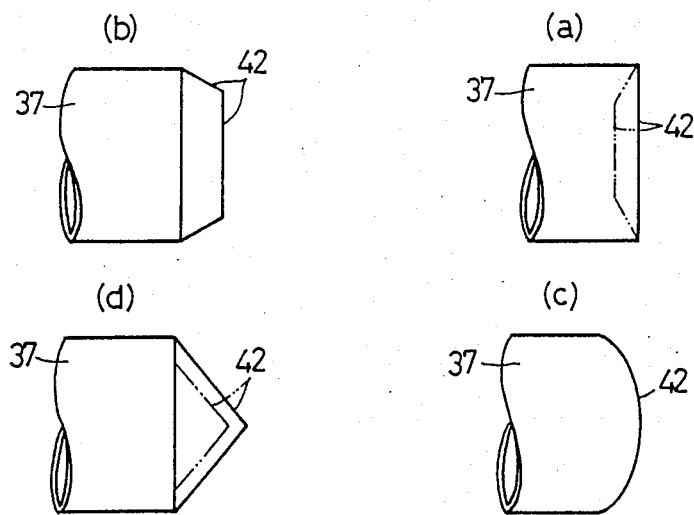
FIGS. 4(a), 4(b), 4(c) and 4(d) are side elevational views of the leading end of various modifications of the movable valve body.

Stator 40 is attached adjustably by a threaded portion 58 to the inner cylinder 44, and the moving distance and responsiveness of the movable valve body 37 can be mainly regulated by altering the force exerted by the spring 41. The responsiveness can be altered also by the configuration of the gas flow pressure bearing surface 42. In the examples in FIGS. 4, a recess shape designated by a dash-dotted line in FIG. 4(a) is most sensitive, a flat shape is next most sensitive, and the configurations in FIGS. 4(b), 4(c) and 4(d) are sequentially increasingly less sensitive, i.e., increased in the stability against the variation in the energy in this order. With the same coil, the conical pressure bearing surface acts stronger at the spring constant than the flat pressure bearing surface to vary its responsiveness. FIGS. 4(a) and 4(d) show modifications of the pressure bearing surfaces to obtain predetermined responsiveness by the combination of the conical and flat surfaces shown by dash-dotted lines.

At the rear of the exemplified muffler 30, an accelerator 60 is provided to further accelerate in multiple stages the flow of the exhaust gas and is formed by a tapered conduit 61 and first and second accelerating portions 62, 63 which generate a strong negative pressure (vacuum). The negative pressure generator including accelerator part 60 serves to suck an air stream, through suction conduit 70 which cools the engine 10, through first and second air intake ports 64, 65 formed immediately after accelerating portions 62, 63, respectively, by the negative pressure. Thus, since an extremely strong forced air cooling is produced in response to the speed of the engine, sufficient cooling effect is obtained merely by using the water jacket of the watercooled engine as an air jacket. Numeral 66 designates a cooling air intake port, and numeral 67 denotes a reverse silencer for preventing exhaust sound from passing reversely through conduit 70 toward the engine and a momentary pressure pulsating from occurring. 68 depicts a casing, numeral 69 indicates a tail tube, and numeral 71 designates an external cooling fan to be provided as required.

In the construction described above, the movable valve body 37 is urged forwardly by the coil spring 41 into contact with the throttle seat 38 when the engine 10 is not running. When the engine 10 is started, the flow of the exhaust gas in exhaust conduit 20 is fed from the connection port 31 into the muffler 30, and through idle passage 35 and bypass passages 52, 53 to accelerator 60. Since the idle passage 35 is set for a smaller flow rate than the flow rate of the exhaust gas during idling, the internal pressure in the chamber surrounded by the tapered wall 34 is enhanced with the result that it becomes in the same state as that in which a load is applied to the engine 10. Thus, the engine 10 raises its output to resist against the load to improve the torque.

As the RPM of the engine is accelerated, the increased energy of the exhaust gas overcomes the resilient force of coil spring 41 to move rearwardly the movable valve body 37 to stop at the balanced position. Thus, the regulating ports 45 of the regulating region 39 between the pressure bearing surface 42 and the seat 38 are opened in a range responsive to the rearward stroke of the movable valve body 37, thereby feeding the exhaust gas to the bypass passages 52, 53. In this case, the pressure bearing surface 42 of the movable valve body 37 resists against the energy of the exhaust gas stream by the force of spring coil 41. Therefore, the rate of imposing a load on the engine 10 is lower than at idling, but still acts in a direction for increasing the torque of the engine at low speed.

When the rotating speed of the engine is further accelerated to arrive at the ordinary operation range, the movable valve body 37 is completely moved rearwardly to fully open the regulating ports 45 of the regulating region 39. Thus, the load on the engine due to restriction of the flow of the exhaust gas at this time becomes relatively small and the exhaust gas flows smoothly. In this state, the exhaust gas flows into the bypass passages between cylinders 44, 49 and 50 through the holes therein and against annular wall 55 which directs it through passages 52, 53, 46 and mainly flows out from the rear opening 36 to be simultaneously silenced by the silencing actions of expansion, bypass and resonance. When the rotating speed of the engine is enhanced to a predetermined value or higher to arrive at a power band range, the flow rate of the exhaust gas passing the acceleration outlet 54 is accelerated to enhance the exhaust sound.

The exhaust gas is not reversely fed from the accelerator 60 to the suction conduit 70 in the idling state when the throttle of the accelerator is fully closed. When the throttle of the accelerator is fully closed at high RPM, the discharge of the exhaust gas is limited by the idle passage 35. As a result, it functions as an exhaust brake to contribute to enhancing the action of engine braking.

Therefore, according to the present invention, a large torque can be obtained when the internal combustion engine is idled. Thus, the idling of the engine is very stabilized, and even if the RPM of the engine is raised gradually from that during idling, the invention contributes to an improvement in the torque to maintain stable operation. Therefore, the engine is not stopped, and even if the vehicle is operated at slightly insufficient output power by a low speed high reduction gear, the vehicle can be sufficiently started. Since the movable valve body 37 is moved to the fully opened position at high RPM, the engine can be operated stably at this time.

WHAT IS CLAIMED IS:

1. A back pressure generator for affecting torque of an internal combustion engine having an exhaust system comprising:
   a tubular housing;
   a main passage means for exhaust gas in said housing;
   a valve body movably supported in said main passage means for movement in response to the force of the exhaust gas on said valve body;
   a valve seat in said main passage means engageable by said valve body in a closed position for closing said main passage means;
   valve body urging means for resiliently urging said valve body towards said closed position and having a predetermined force characteristic for moving said valve body into said closed position when the engine is idling and allowing said valve body to move in a direction substantially downstream of the exhaust gas flow proportionally in response to the force of the exhaust gas on said valve body to a fully open position;
   regulating means in said main passage means for controlling the flow of exhaust gas through said main passage means in response to the position of said valve body; and
   separate idle passage means in said housing for by-passing flow of exhaust gas around said valve body when said valve body is in at least said closed position and having a size for restricting flow sufficiently to produce back pressure in the exhaust system and affect the torque of the engine without stalling the engine.

2. A back pressure generator as claimed in claim 1 wherein:
   said valve body urging means comprises spring means having one end fixed with respect to said main passage means and the other end engaging said valve body; and
   said regulating means comprises at least one regulating hole in said main passage means engageable by said valve body for closing said at least one regulating hole when said valve body engages said valve seat and variably opening said at least one regulating hole when said valve body is between said closed and fully open positions.

3. A back pressure generator as claimed in claim 2 wherein:
   said main passage means comprises a main cylindrical member;
   said at least one regulating hole extends through the wall of said main cylindrical member; and
   said valve body is slidably mounted in said cylindrical member.

4. A back pressure generator as claimed in claim 3 wherein:
   said housing comprises an inlet end for connecting to an outlet end of an exhaust pipe;
   a tapered reducing section is provided in said housing downstream of said inlet end and has a smaller cross-sectional area outlet end downstream of a larger-cross-sectional area inlet end; and
   said main cylindrical member has an inlet end connected to and downstream of said tapered section outlet end and an inner diameter smaller than the tapered section inlet end.

5. A back pressure generator as claimed in claim 4 and further comprising:
   a second cylindrical member surrounding in spaced relationship said main cylindrical member;
   holes through said second cylindrical member;
   a third cylindrical member surrounding in spaced relationship said second cylindrical member; and wherein
   said idle passage means comprises at least one restricting hole through said housing inlet end and having an inlet end through said tapered reducing section and an outlet end communicating with the space between said main and second cylindrical members.

6. A back pressure generator as claimed in claim 5 wherein:
   said idle passage means comprises a plurality of said restricting holes; and
   said main cylindrical member has an intermediate heat insulator section surrounding at least part of said spring means.

7. A back pressure generator as claimed in claim 6 and further comprising:
   a heat insulating means closing the space between said main and second cylindrical members and substantially surrounding said intermediate heat insulator section so that exhaust gas flows through said holes in said second cylindrical member and through the space between said second and third cylindrical members.

8. A back pressure generator as claimed in claim 7 and further comprising:
   an annular wall means closing the space between said second and third cylindrical members at a position rearward of said heat insulating means so that exhaust gas flows through said holes in said second and main cylindrical members rearwardly of said heat insulating means.

9. A back pressure generator as claimed in claim 8 and further comprising:
   a rear end member on said housing;
   a main passage outlet through said rear end member;
   bypass outlet means through said rear end member having an inlet communicating with said space between said second and third cylindrical members rearwardly of said annular wall means; and
   exhaust gas stream acceleration means in said main passage outlet.

10. A back pressure generator as claimed in claim 9 wherein:
    said valve body has a forward end having a substantially convex hemispherical shape.

11. A back pressure generator as claimed in claim 1 wherein:
    said valve body has a forward end having a substantially convex hemispherical shape.

12. A back pressure generator as claimed in claim 2 wherein:
   said valve body comprises a hollow cylindrical member; and
   said spring means extends into said hollow cylindrical member.

13. A back pressure generator as claimed in claim 11 wherein:
   said valve body comprises a hollow cylindrical member; and
   said spring means extends into said hollow cylindrical member.

14. A back pressure generator as claimed in claim 2 and further comprising:
   an adjustable stator adjustably mounted in said main cylindrical member for axial adjustment therein;
   said one end of said spring means engaging said stator so that axial adjustment of said stator varies the force characteristic of said spring means.

15. A back pressure generator as claimed in claim 12 and further comprising:
   an adjustable stator adjustably mounted in said main cylindrical member for axial adjustment therein;
   said one end of said spring means engaging said stator so that axial adjustment of said stator varies the force characteristic of said spring means.

16. A back pressure generator as claimed in claim 13 and further comprising:
   an adjustable stator adjustably mounted in said main cylindrical member for axial adjustment therein;
   said one end of said spring means engaging said stator so that axial adjustment of said stator varies the force characteristic of said spring means.

17. A back pressure generator for affecting torque of an internal combustion engine having an exhaust system comprising:
   a tubular housing;
   an inlet end on said tubular housing having an inlet opening for connection in series with said exhaust system;
   an inner tubular element in said housing having an upstream end connected to said inlet end of said housing;
   a plurality of holes through said inner tubular element;
   a second tubular element surrounding said inner tubular element in spaced relation thereto and having an upstream end connected to said inlet end;
   a piston valve member slidably mounted in said inner tubular element;
   spring means for resiliently urging said piston valve member into engagement with said inlet end of said housing for closing said upstream end of said inner tubular member;
   a plurality of restricting holes through said inlet end of said housing having downstream ends communicating with the space between said inner tubular element and said second tubular element;
   a plurality of holes through said second tubular element;
   blocking means closing an intermediate part of the space between said inner and second tubular members; and
   at least one outer tubular element surrounding said second tubular element in spaced relation thereto;
   so that at a predetermined lower pressure in said exhaust system pipe said spring means moves said piston valve member to close said upstream end of said inner tubular element and exhaust gas flows through said restricting holes, said holes in said second tubular element, and the space between said second and at least one outer tubular element.

* * * * *